(12) United States Patent
Parker et al.

(10) Patent No.: US 10,134,293 B2
(45) Date of Patent: Nov. 20, 2018

(54) SYSTEMS AND METHODS FOR AUTONOMOUS DRONE NAVIGATION

(71) Applicant: Walmart Apollo, LLC, Bentonville, AR (US)

(72) Inventors: Jon Leland Parker, Bentonville, AR (US); Christopher M. Johnson, Bella Vista, AR (US); Earl Otto Williams, Bentonville, AR (US); Jyoti Prakash Malik, Centerton, AR (US); Nigel M. Foucha, Dallas, TX (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/464,659

(22) Filed: Mar. 21, 2017

(65) Prior Publication Data
US 2017/0270805 A1 Sep. 21, 2017

Related U.S. Application Data

(60) Provisional application No. 62/311,060, filed on Mar. 21, 2016.

(51) Int. Cl.
*G08G 5/00* (2006.01)
*B64C 39/02* (2006.01)
(Continued)

(52) U.S. Cl.
CPC ......... *G08G 5/0069* (2013.01); *B64C 39/024* (2013.01); *B64D 47/08* (2013.01);
(Continued)

(58) Field of Classification Search
CPC .. G08G 5/0069; G08G 5/0034; B64C 39/024; B64D 47/08; G01C 21/206; G05D 1/0011; G05D 1/102
(Continued)

(56) References Cited

U.S. PATENT DOCUMENTS 8,686,326 B1 4/2014 Dennison et al.
9,817,848 B2 * 11/2017 McKinnon ........ G06F 17/30268
(Continued)

FOREIGN PATENT DOCUMENTS

CN 104236548 A 12/2014
WO 2015/029007 A1 3/2015

OTHER PUBLICATIONS

Ascending Technologies, UAV Slam, State Estimation for Indoor and Outdoor Operation with a Micro-Aerial Vehicle. Retrieved online at: http://www.asctec.de/en/uav-uas-drone-applications/uav-slam-simultaneous-localization-mapping/ 2 pages. Jan. 13, 2016.
(Continued)

*Primary Examiner* — Marthe Y Marc-Coleman
(74) *Attorney, Agent, or Firm* — McCarter & English, LLP; David R. Burns

(57) ABSTRACT

Described are systems, methods, and computer readable medium for a drone navigation system. Exemplary embodiments provide a drone with an imaging device and a computing device in communication with the drone. The computing device receives a selection of a CAD blueprint that includes measurements of an interior portion of a building, and receives a start point and an end point on the blueprint. The computing device analyzes the blueprint and generates a route from the start point to the end point, and determines a first set of instructions in terms of distance and degrees to navigate the generated route. The computing device processes the first set of instructions to generate a second set of instructions in terms of yaw, pitch and roll. The second set of instructions are exported to the drone to cause the drone to navigate the generated route in the building.

20 Claims, 4 Drawing Sheets

(51) Int. Cl.
*B64D 47/08* (2006.01)
*G01C 21/20* (2006.01)
*G05D 1/00* (2006.01)
*G05D 1/10* (2006.01)

(52) U.S. Cl.
CPC ......... *G01C 21/206* (2013.01); *G05D 1/0011* (2013.01); *G05D 1/102* (2013.01); *G08G 5/0034* (2013.01)

(58) Field of Classification Search
USPC .................................. 701/2; 901/1; 345/175
See application file for complete search history.

(56) References Cited

U.S. PATENT DOCUMENTS

| | | | |
|---|---|---|---|
| 2004/0133483 | A1 | 7/2004 | Potter et al. |
| 2008/0077511 | A1 | 3/2008 | Zimmerman |
| 2011/0043515 | A1 | 2/2011 | Stathis |
| 2015/0109338 | A1* | 4/2015 | McKinnon ........ G06F 17/30244 345/633 |
| 2016/0070265 | A1 | 3/2016 | Liu et al. |
| 2016/0321503 | A1* | 11/2016 | Zhou .................. G06K 9/00637 |
| 2016/0343140 | A1* | 11/2016 | Ciprari .................... G06T 17/20 |

OTHER PUBLICATIONS

Ferguson et al., Micro-dromes: The new face of cutting-edge warfare. New Scientist. Jul. 2012. Issue 2874. 3 pages.
The smart drones that can fly themselves withougt GPS: Photos. Retrieved online at: http://www.zdnet.com/pictures/the-smart-drones-that-can-fly-themselves-without-gps-photos/ 2 pages. Mar. 20, 2015.
UAS Vision, UAS Navigation without GPS. Retrieved online at: https://www.uasvision.com/2015/06/02/uas-navigation-without-gps/ 1 page. Jun. 2, 2015.

* cited by examiner ical patent application No. 62/311,060 filed on Mar. 21, 2016, which is hereby incorporated by reference in its entirety.

SYSTEMS AND METHODS FOR AUTONOMOUS DRONE NAVIGATION

RELATED APPLICATION

This application claims priority to U.S. Provisional Patent Application No. 62/311,060 filed on Mar. 21, 2016, which is hereby incorporated by reference in its entirety.

BACKGROUND

Large facilities such as warehouses and large superstores, store and/or display large amounts of different products. The inventory in warehouses and the product displays in retail stores require constant checking to ensure their presence and compliance with company rules for product displays. Conventionally, checking inventory and product displays has required the assignment of company employees to manually verify the inventory status and the compliance of the product displays.

Drones are robotic devices that may function autonomously without direct user control or alternatively may be directly controlled by users. Drones may be aerial vehicles, may be land-based vehicles and/or may function in underwater environments. Flying drones operate similarly to airplanes via yaw, pitch and roll commands. Autonomous drones may receive a flight path and navigate the flight path without further instruction from a user. Drones of all varieties may be equipped with a communication capability enabling communication to monitoring location, imaging capabilities allowing them to take video or still pictures, and/or may include the ability to grasp and carry objects.

BRIEF SUMMARY

In one embodiment a drone system includes a drone equipped with an imaging device and a computing device equipped with an extraction module, a conversion module and a communication interface that enables communication with the drone. The extraction module is configured to receive a selection of a CAD blueprint. The CAD blueprint includes measurements of an interior portion of a building. The extraction module is further configured to receive input indicating a start point and an end point on the blueprint, to analyze the blueprint to generate a route from the start point to the end point, and to determine a first set of instructions in terms of distance and degrees to navigate the generated route. The conversion module includes an API and is configured to, using the API, process the first set of instructions to generate a second set of instructions for drone operation. The second set of instructions represents the distance and degrees of the first set of instructions converted into yaw, pitch and roll instructions. The conversion module is also configured to export the second set of instructions as commands to the drone via the communication interface to cause the drone to navigate the route in the building.

In another embodiment, a method for navigating a drone includes receiving, at an extraction module, a selection of a CAD blueprint. The CAD blueprint includes measurements of an inside of a building. The method further includes receiving input indicating a start point and an end point on the blueprint, analyzing the blueprint to generate a route from the start point to the end point and determining a first set of instructions in terms of distance and degrees to navigate the generated route. The method also processes, at a conversion module using an API, the first set of instructions to generate a second set of instructions for drone operation. The second set of instructions representing the distance and degrees of the first set of instructions converted into yaw, pitch and roll instructions. The method additionally exports the second set of instructions as commands to the drone via the communication interface to cause the drone to navigate the route in the building.

In yet another embodiment, a non-transitory computer readable medium stores instructions that when executed by a processor causes the processor to implement a method for navigating a drone. The method includes receiving, at an extraction module, a selection of a CAD blueprint. The CAD blueprint includes measurements of an inside of a building. The method further includes receiving input indicating a start point and an end point on the blueprint, analyzing the blueprint to generate a route from the start point to the end point and determining a first set of instructions in terms of distance and degrees to navigate the generated route. The method also processes, at a conversion module, the first set of instructions to generate a second set of instructions for drone operation. The second set of instructions representing the distance and degrees of the first set of instructions converted into yaw, pitch and roll instructions. The method additionally exports the second set of instructions as commands to the drone via the communication interface to cause the drone to navigate the route in the building.

BRIEF DESCRIPTION OF DRAWINGS

The accompanying drawings, which are incorporated in and constitute a part of this specification, illustrate one or more embodiments of the invention and, together with the description, help to explain the invention. The embodiments are illustrated by way of example and should not be construed to limit the present disclosure. In the drawings.

DESCRIPTION OF EXEMPLARY EMBODIMENTS

One alternative to the use of company employees traversing the warehouse and store aisles to perform inventory and product display checks is to use a drone in place of the store employee. Using a drone to perform tasks may result in higher efficiency and lower costs. However, the most cost savings occur if the drone can be operated autonomously without requiring constant interaction with a human. Conventional systems use GPS or beacons for autonomous operation of a drone outdoors. However the use of GPS and beacons is not well-suited for autonomous operation of a drone indoors to perform inventory checking and other tasks. Embodiments of the present invention provide a technique for autonomous drone operation not relying on GPS or beacons.

Described in detail herein are systems, methods, and computer readable medium for a drone navigation system. Exemplary embodiments provide for autonomous operation of a drone indoors without using GPS or beacon technology.

The drone navigation system described herein uses a Computer Aided Design (CAD) blueprint to facilitate autonomous operation of the drone. As used herein, CAD blueprint refers to a blueprint generated using CAD, where the blueprint documents an architecture and an interior layout of a building measurements and distances related to the interior layout. The CAD blueprint is used to generate a route and directions for the drone to navigate. The route directions are then converted to commands that a drone can understand and use to navigate the route. In a non-limiting example, the drone navigation system can be used in a retail store environment for checking inventory in a warehouse or product displays in the retail store.

As used herein, "drone" refers to an unmanned aerial or ground vehicle. The drone may be any commercially available or other drone capable of performing the functionalities described herein, including operating in an indoors environment. The drone is capable of autonomous flight, is aware of its surroundings, and is programmable. The drone also includes an imaging device or an image capture device, such as a camera, to capture photographs, video, and/or audio. The drone may also include a processing device or an on-board computing device and memory to store instructions or data and communication ability to communicate with a monitoring device.

As used herein, API refers to an application program interface including a set of routines, protocols, and tools. The API described herein may be specifically configured to facilitate conversion of a first set of instructions generated from measurements in a CAD blueprint into a second set of instructions that function as drone commands.

Figure 1:
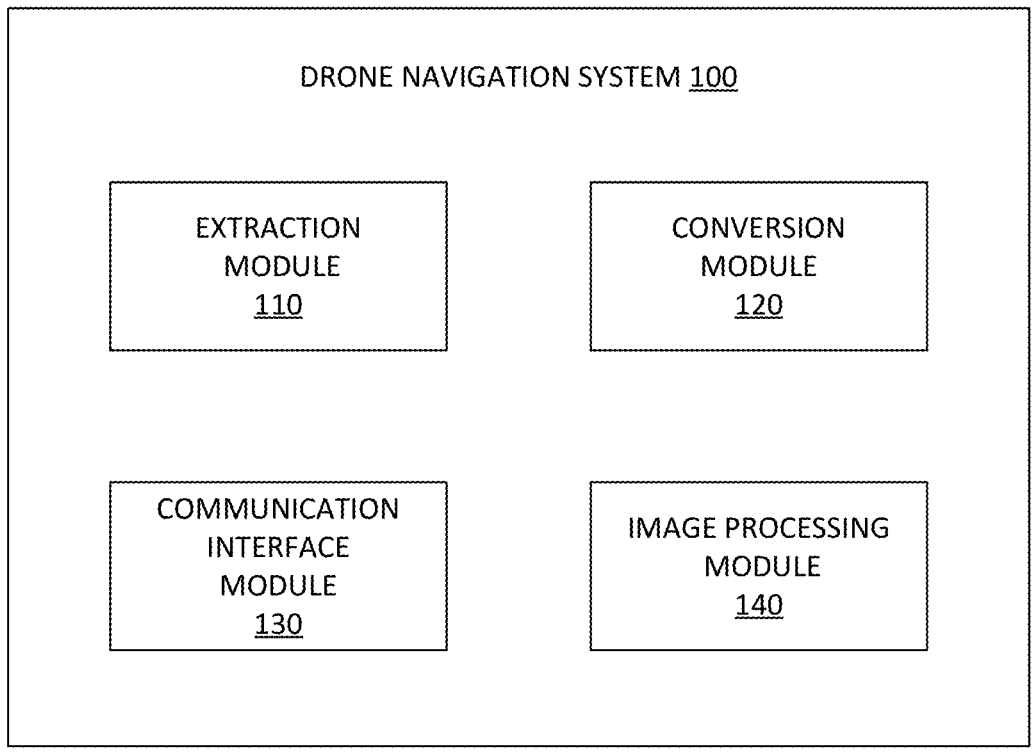
FIG. 1 is a block diagram showing a drone navigation system implemented in modules, according to an example embodiment.

FIG. 1 is a block diagram showing a drone navigation system 100 in terms of modules according to an example embodiment. The modules may include an extraction module 110, a conversion module 120, a communication interface module 130, and an image processing module 140. One or more of the modules of system 100 may be implemented in device 320 or server 330 of FIG. 3. For example, modules 110, 120, and 130 may be implemented in device 320, while module 140 may be implemented in server 330. The modules may include various circuits, circuitry and one or more software components, programs, applications, or other units of code base or instructions configured to be executed by one or more processors included in device 320 or server 330. Although modules 110, 120, 130, and 140 are shown as distinct modules in FIG. 1, it should be understood that modules 110, 120, 130, and 140 may be implemented as fewer or more modules than illustrated. It should be understood that any of modules 110, 120, 130, and 140 may communicate with one or more components included in system 300 (FIG. 3), such as drone 310, device 320, server 330 or database(s) 340.

The extraction module 110 may be configured to manage and analyze CAD blueprints, manage and generate navigation routes based on a CAD blueprint, and manage and generate instructions or directions to navigate a generated route. The conversion module 120 may be configured to maintain an API, and analyze and convert directions to navigate a route to drone navigation or operation commands. The communication interface module 130 may be configured to manage and facilitate communications between a device and a drone. The image processing module 140 may be configured to manage and analyze image data provided by a drone.

Figure 2:
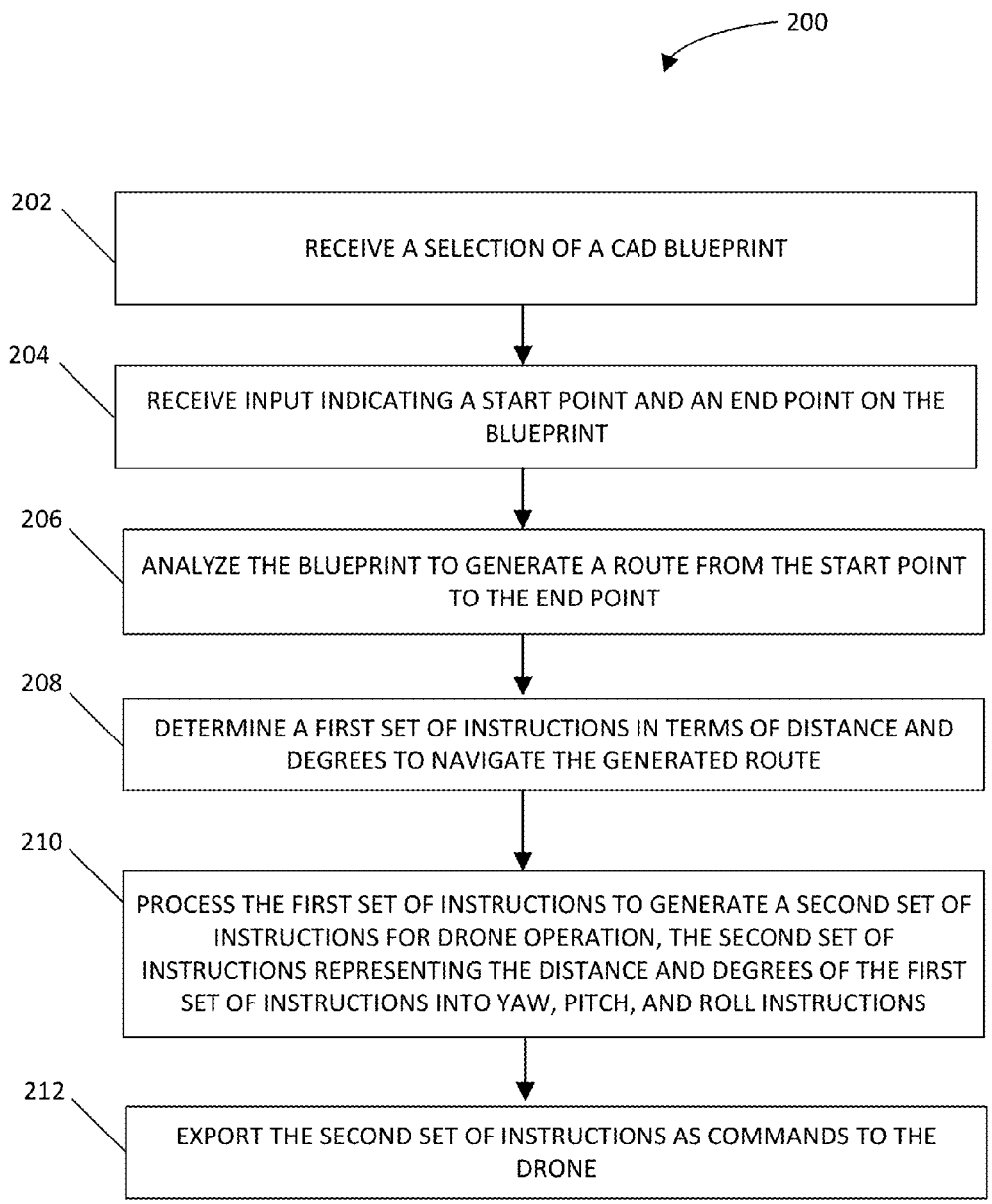
FIG. 2 is a flowchart showing an exemplary method for navigating a drone, according to an example embodiment.

FIG. 2 is a flowchart showing an exemplary method 200 for navigating a drone, according to an example embodiment. The steps of method 200 may be performed by one or more modules shown in FIG. 1.

At step 202, the extraction module 110 receives a selection of a CAD blueprint that includes measurements of an interior portion of a building. The CAD blueprint may be previously generated based on the interior dimensions and layout of a building. In an example embodiment, the building may be a warehouse or a retail store. The building may include various fixtures and shelves to hold inventory or items. The shelves and fixtures may be arranged in rows or aisles in the building. The CAD blueprint indicates the positions of fixtures and shelves within the building, and can include a plurality of rows or aisles of shelves as housed in the building. The CAD blueprint provides ascertainable measurements and distances between its depicted features in the interior location.

In an example embodiment, a user may be presented with multiple CAD blueprints via a user interface displayed on a device (e.g., device 320). The user can select one of the CAD blueprints via the user interface on the device (via a touchscreen interface or an input device such as a mouse), and the extraction module 110 receives the selection of the CAD blueprint. The user may select the CAD blueprint based on which building he or she wants the drone to navigate. In some embodiments, the CAD blueprint may be based on only a portion of the building, and the user can select which portion of the building he or she wants the drone to navigate.

At step 204, the extraction module 110 receives input indicating a start point and an end point on the blueprint. The user can select a start point on the blueprint via the user interface that represents where he or she wants the drone to start its navigation. The user can also select an end point on the blueprint via the user interface that represents where he or she wants the drone to end its navigation. The user can select the start point and the end point by clicking on the respective points or location on the blueprint displayed in the user interface. Alternatively, the user may enter information regarding the start point and the end point via a text field or some other input fields displayed in the user interface.

In an example embodiment, the user may also select a home base point via the user interface, where the home base point indicates a location where the drone may navigate to after completing navigation of the generated route. The home base point may be a charging station for the drone.

At step 206, the extraction module 110 analyzes the blueprint to generate a route from the start point to the end point. In an example embodiment, where the blueprint includes rows or aisles of shelves, the extraction module 110 is configured to generate the route from the start point to the end point through each of the plurality of rows or aisles of shelves. The extraction module 110 may use any appropriate mapping or routing algorithm to generate a route from the start point to the end point. In one embodiment the route may be generated to cover the shortest distance. In another embodiment, the route may be generated to traverse the most aisles. In an embodiment, the extraction module receives the start and endpoint as input for the route and establishes waypoints at a predetermined distance from each fixture indicated in the CAD blueprint. On the route, the drone is instructed to fly between waypoints stopping at each waypoint to record each fixture until the entire facility has been scanned. It will be appreciated that rather than establishing waypoints based on all the fixtures depicted in the CAD blueprint, a subset of the fixtures may be used to establish waypoints, and thus the route, based for example on the type of fixture or some other criteria.

At step 208, the extraction module 110 determines a first set of instructions in terms of distance and degrees to navigate the generated route. One may consider the first set of instructions as directions for a human to navigate the route using distance and turns. The first set of instructions may be determined using any appropriate mapping or routing algorithm that may be different than or same as the algorithm used to generate the route. The first set of instructions may also include a safe height for drone operation to navigate the generated route.

At step 210, the conversion module 120 processes the first set of instructions to generate a second set of instructions for operating the drone (e.g., drone 310). The second set of instructions represent the distance and degrees from the first set of instructions as yaw, pitch and roll instructions for the drone to navigate or fly the generated route. Yaw, pitch and roll are often used to facilitate flying of airplanes. This concept is applied here to fly the drone on the generated route. The conversion module 120 includes an API specifically configured to convert or translate distance and degrees of the first set of instructions to yaw, pitch and roll instructions for operating the drone. In an embodiment not using a flying drone, the conversion module may convert the first set of instructions into commands suitable for other types of drones, for example, ground drones or aquatic-based drones.

At step 212, the communication interface 130 exports the second set of instructions as commands to the drone. In an example embodiment, the second set of instructions may be communicated to the drone wirelessly from the device. Each instruction from the second set may be transmitted one by one as a command to the drone. After each command is executed, the drone may transmit a completion signal or message to the device. After the completion signal or message is received, the communication interface 130 automatically transmits the next command to the drone. In this manner, the drone is in constant communication with the device. If the drone loses the communication connection with the device, an alert message may be generated and displayed via the user interface on the device. The user may take any necessary actions in response to the alert message to reconnect with the drone. In some embodiments, an alert message may be generated and displayed on the device if the drone crashes into an object or person. This alert message may be generated using the sensors on the drone when a flight hazard is detected.

In some embodiments, while the drone is navigating the route, the device may adjust the second set of instructions based on any drift from the assigned route observed by the drone. The drift may be detected by the sensors on the drone, and the second set of instructions may correct the course of the drone or realign the drone to the route as appropriate.

In an example embodiment, the second set of instructions also includes instructions for the drone to stop periodically while navigating the route and actuate the imaging device to acquire imaging data. In one embodiment, the drone may store the imaging data while it is navigating the route, and the imaging data may be transmitted to a server (e.g., server 330) after completion of the route for image processing by the image processing module 140 included in the server. In another embodiment, the drone may transmit the imaging data while continuing to traverse the route. In some embodiments, the position of the drone and the time at when the imaging device is actuated is recorded by the server in a database (e.g., database(s) 340).

In the non-limiting example, where the building is a warehouse or a retail store, the imaging data may indicate information related to items placed on a plurality of shelves in the building. The imaging module 140 may automatically process the imaging data to identify one or more items on the shelves. The imaging module 140 may also automatically determine whether an item is at the correct shelf or in the correct aisle (i.e., if the item is mis-shelved), or whether a shelf needs to be restocked. The imaging module 140 may also determine whether a fixture in the building needs inspection.

In this manner, the drone navigation system provides for autonomous operation of a drone to navigate a route indoors. As described above, this is achieved using a CAD blueprint of an interior portion of a building, generating a route and directions to navigate the route using the CAD blueprint, and then converting the directions to commands that a drone can understand.

Figure 3:
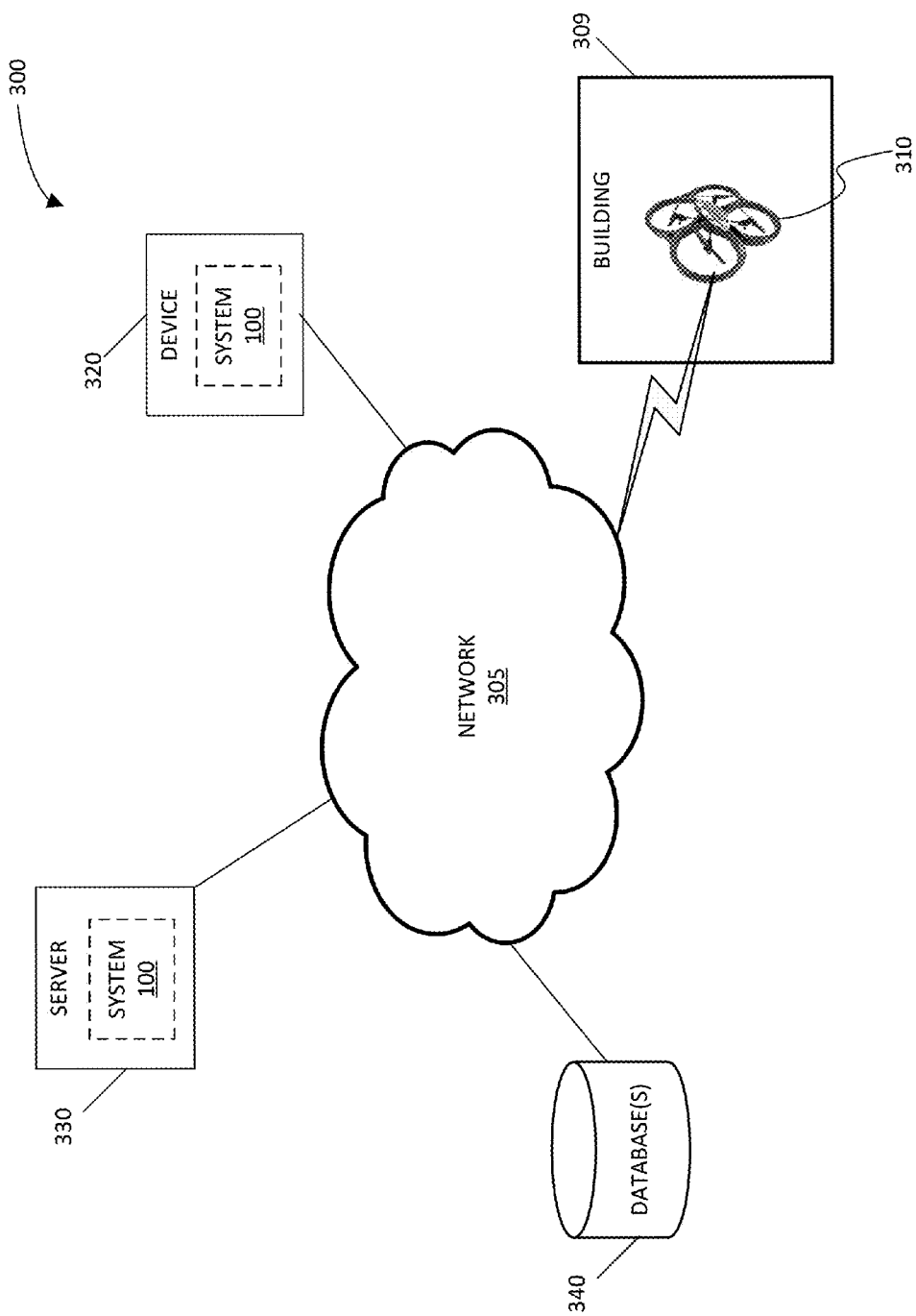
FIG. 3 illustrates a network diagram depicting a system for implementing the drone navigation system, according to an example embodiment.

FIG. 3 illustrates a network diagram depicting a system 300 for implementing the drone navigation system, according to an example embodiment. The system 300 can include a network 305, a drone 310 inside of building 309, a device 320, a server 330, and database(s) 340. Each of components 310, 320, 330, and 340 is in communication with the network 305.

In an example embodiment, one or more portions of network 305 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The drone 310 may include, but is not limited to, an image capturing device, such as a camera to capture video, photographs, and/or audio data. The drone 310 may also include a wireless communication interface or mechanism to facilitate communications with various devices, such as device 320 and/or servers, such as server 330.

The device 320 may include, but is not limited to, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. The device 320 can include one or more components described in relation to computing device 400 shown in FIG. 4. In one embodiment, the device 320 is a tablet computing device operated by an employee of a retail store or warehouse.

The device 320 may connect to network 305 via a wired or wireless connection. The device 320 may include one or more applications such as, but not limited to, the drone navigation system 100 described herein.

In an example embodiment, some of the components of the drone navigation system 100 may be included in the device 320, while the other components are included in the server 330. Some of the functionalities of the drone navigation system described herein may be performed by the device 320, such as receiving a selection of a CAD blueprint, generating a navigation route, and exporting commands to the drone 310, while other of the functionalities may be performed by the server 330, such as processing and analyzing of the image data acquired by the drone 310.

Each of the database(s) 340 and server 330 is connected to the network 305 via a wired connection. Alternatively, one or more of the database(s) 340 and server 330 may be connected to the network 305 via a wireless connection. The server 330 include one or more computers or processors configured to communicate with the drone 310, the device 320, and database(s) 340 via network 305. The server 330 hosts one or more applications or websites accessed by the device 320 and/or facilitate access to the content of database(s) 340. Database(s) 340 include one or more storage devices for storing data and/or instructions (or code) for use by the device 320 and server 330. Database(s) 340, and/or server 330, may be located at one or more geographically distributed locations from each other or from the device 320. Alternatively, database(s) 340 may be included within server 330.

Figure 4:
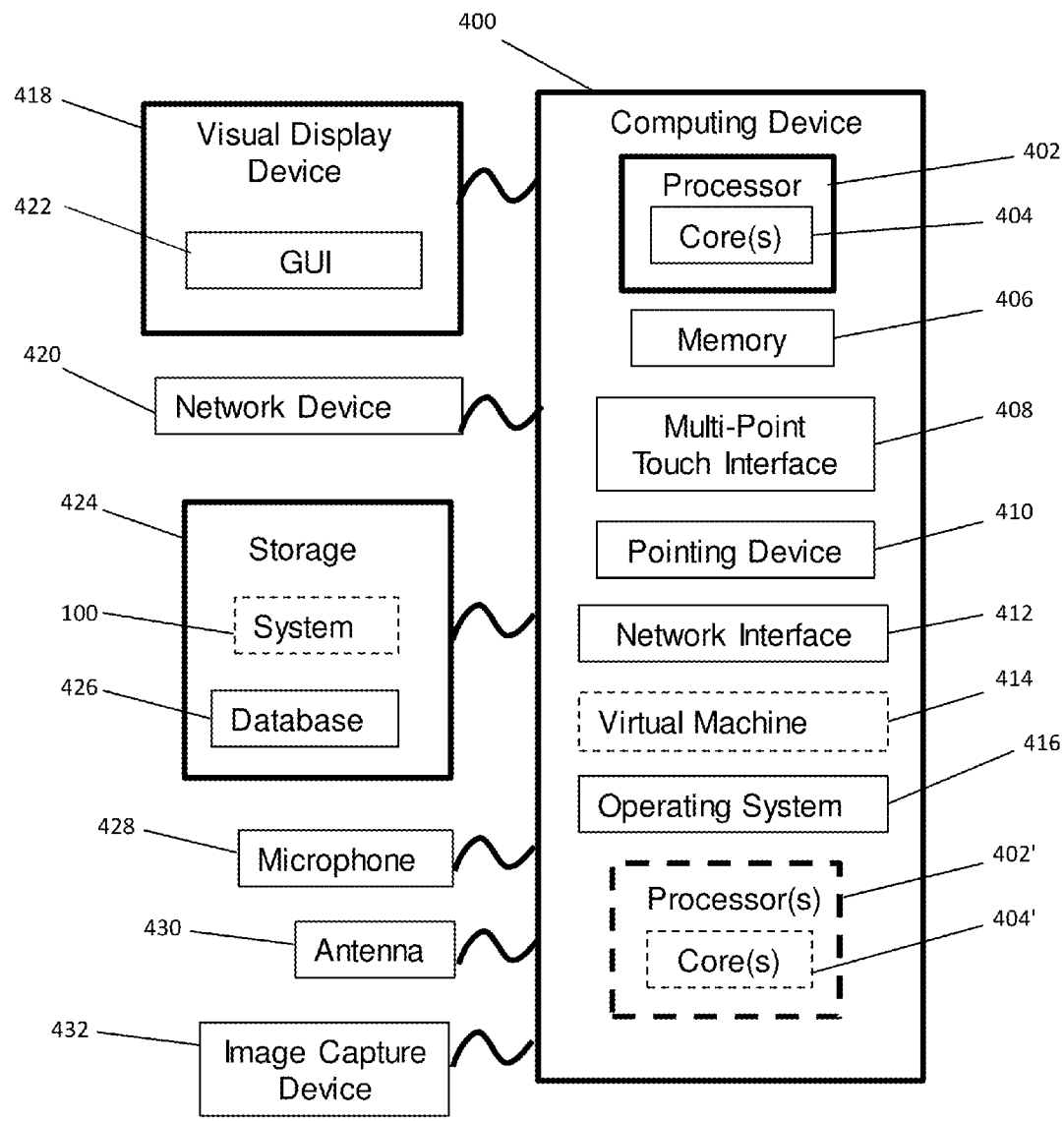
FIG. 4 is a block diagram of an exemplary computing device that can be used to implement exemplary embodiments of the drone navigation system described herein.

FIG. 4 is a block diagram of an exemplary computing device 400 that may be used to implement exemplary embodiments of the drone navigation system 100 described herein. The computing device 400 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 406 included in the computing device 400 may store computer-readable and computer-executable instructions or software for implementing exemplary embodiments of the drone navigation system 100. The computing device 400 also includes configurable and/or programmable processor 402 and associated core 404, and optionally, one or more additional configurable and/or programmable processor(s) 402' and associated core(s) 404' (for example, in the case of computer systems having multiple processors/cores), for executing computer-readable and computer-executable instructions or software stored in the memory 406 and other programs for controlling system hardware. Processor 402 and processor(s) 402' may each be a single core processor or multiple core (404 and 404') processor.

Virtualization may be employed in the computing device 400 so that infrastructure and resources in the computing device may be shared dynamically. A virtual machine 414 may be provided to handle a process running on multiple processors so that the process appears to be using only one computing resource rather than multiple computing resources. Multiple virtual machines may also be used with one processor.

Memory 406 may include a computer system memory or random access memory, such as DRAM, SRAM, EDO RAM, and the like. Memory 406 may include other types of memory as well, or combinations thereof.

A user may interact with the computing device 400 through a visual display device 418, such as a computer monitor, which may display one or more graphical user interfaces 422 that may be provided in accordance with exemplary embodiments. The computing device 400 may include other I/O devices for receiving input from a user, for example, a keyboard or any suitable multi-point touch interface 408, a pointing device 410 (e.g., a mouse), a microphone 428, and/or an image capturing device 432 (e.g., a camera or scanner). The multi-point touch interface 408 (e.g., keyboard, pin pad, scanner, touch-screen, etc.) and the pointing device 410 (e.g., mouse, stylus pen, etc.) may be coupled to the visual display device 418. The computing device 400 may include other suitable conventional I/O peripherals.

The computing device 400 may also include one or more storage devices 424, such as a hard-drive, CD-ROM, or other computer readable media, for storing data and computer-readable instructions and/or software that implement exemplary embodiments of the drone navigation system 100 described herein. Exemplary storage device 424 may also store one or more databases for storing any suitable information required to implement exemplary embodiments. For example, exemplary storage device 424 can store one or more databases 426 for storing information, such as CAD blueprints, image data captured by the drone 310, specification or model information for the drone 310, and/or any other information to be used by embodiments of the system 100. The databases may be updated manually or automatically at any suitable time to add, delete, and/or update one or more items in the databases.

The computing device 400 can include a network interface 412 configured to interface via one or more network devices 420 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing device 400 can include one or more antennas 430 to facilitate wireless communication (e.g., via the network interface) between the computing device 400 and a network. The network interface 412 may include a built-in network adapter, network interface card, PCMCIA network card, card bus network adapter, wireless network adapter, USB network adapter, modem or any other device suitable for interfacing the computing device 400 to any type of network capable of communication and performing the operations described herein. Moreover, the computing device 400 may be any computer system, such as a workstation, desktop computer, server, laptop, handheld computer, tablet computer (e.g., the iPad™ tablet computer), mobile computing or communication device (e.g., the iPhone™ communication device), point-of sale terminal, internal corporate devices, or other form of computing or telecommunications device that is capable of communication and that has sufficient processor power and memory capacity to perform the operations described herein.

The computing device 400 may run any operating system 416, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 416 may be run in native mode or emulated mode. In an exemplary embodiment, the operating system 416 may be run on one or more cloud machine instances.

The following description is presented to enable any person skilled in the art to create and use a computer system configuration and related method and article of manufacture to flexibly secure card data. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes multiple system elements, device components or method steps, those elements, components or steps may be replaced with a single element, component or step. Likewise, a single element, component or step may be replaced with multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:

1. A drone system comprising:
   a drone equipped with an imaging device; and
   a computing device including a communication interface and a processor implementing an extraction module and a conversion module, the communication interface enabling communication with the drone;
   wherein the extraction module when executed:
     receives a selection of a Computer Aided Design (CAD) blueprint, the CAD blueprint including measurements of an interior portion of a building,
     receives input indicating a start point and an end point on the CAD blueprint,
     analyzes the CAD blueprint to generate a route from the start point to the end point, and
     determines a first set of instructions in terms of distance and degrees to navigate the generated route, and
   wherein the conversion module includes an application program interface (API) and when executed:
     processes the first set of instructions using the API to generate a second set of instructions for drone operation, the second set of instructions representing the distance and degrees of the first set of instructions converted into drone navigation commands;
     exports the second set of instructions as commands to the drone via the communication interface to cause the drone to navigate the route in the building.

2. The drone system of claim 1, further comprising:
   a server configured to perform image processing, and
   wherein the second set of instructions also includes instructions for the drone to stop periodically while navigating the route and actuate the imaging device to acquire imaging data, the imaging data transmitted to the server for image processing.

3. The drone system of claim 2, wherein the imaging data indicates information related to items placed on a plurality of shelves in the building.

4. The drone system of claim 3, wherein the position of the drone at a point in time is recorded with respect to the imaging data.

5. The drone system of claim 1, wherein the CAD blueprint indicates positions of fixtures and shelves.

6. The drone system of claim 1, wherein the CAD blueprint includes a plurality of rows or aisles of shelves, and the extraction module is configured to generate the route from the start point to the end point through each of the plurality of rows or aisles of shelves.

7. The system of claim 1, wherein the drone is an unmanned aerial vehicle or unmanned ground vehicle.

8. The system of claim 1, wherein the drone navigation commands in the second set of instructions include yaw, pitch and roll instructions.

9. A computer-implemented method for navigating a drone, the method comprising:
   receiving, at an extraction module implemented at a computing device, a selection of a Computer Aided Design (CAD) blueprint, the CAD blueprint including measurements of an inside of a building, wherein the extraction module further:
     receives input indicating a start point and an end point on the CAD blueprint,
     analyzes the CAD blueprint to generate a route from the start point to the end point, and
     determines a first set of instructions in terms of distance and degrees to navigate the generated route; and
   processing, at a conversion module implemented at the computing device and using an application program interface (API), the first set of instructions to generate a second set of instructions for drone operation, the second set of instructions representing the distance and degrees of the first set of instructions converted into drone navigation commands; and
   exporting the second set of instructions as commands to the drone via a communication interface of the computing device to cause the drone to navigate the route in the building.

10. The method of claim 9, wherein the second set of instructions also includes instructions for the drone to stop periodically while navigating the route and actuate the imaging device to acquire imaging data, the imaging data transmitted to the server for image processing.

11. The method of claim 10, wherein the imaging data indicates information related to items placed on a plurality of shelves in the building.

12. The method of claim 11, wherein the position of the drone at a point in time is recorded with respect to the imaging data.

13. The method of claim 9, wherein the CAD blueprint indicates positions of fixtures and shelves.

14. The method of claim 9, wherein the CAD blueprint includes a plurality of rows or aisles of shelves, and the route is generated from the start point to the end point through each of plurality of rows or aisles of shelves.

15. A non-transitory computer readable medium storing instructions that when executed by a processor causes the processor to implement a method for navigating a drone, the method comprising:

receiving, at an extraction module implemented at the processor, a selection of a Computer Aided Design (CAD) blueprint, the CAD blueprint including measurements of an inside of a building, wherein the extraction module further:
- receiving input indicating a start point and an end point on the CAD blueprint,
- analyzes the CAD blueprint to generate a route from the start point to the end point, and
- determines a first set of instructions in terms of distance and degrees to navigate the generated route; and processing, at a conversion module implemented at the processor and using an application program interface (API), the first set of instructions to generate a second set of instructions for drone operation, the second set of instructions representing the distance and degrees of the first set of instructions converted into drone navigation commands; and exporting the second set of instructions as commands to the drone via a communication interface coupled to the processor to cause the drone to navigate the route in the building.

16. The non-transitory computer readable medium of claim 15, wherein the second set of instructions also includes instructions for the drone to stop periodically while navigating the route and actuate the imaging device to acquire imaging data, the imaging data transmitted to the server for image processing.

17. The non-transitory computer readable medium of claim 16, wherein the imaging data indicates information related to items placed on a plurality of shelves in the building.

18. The non-transitory computer readable medium of claim 17, wherein the position of the drone at a point in time is recorded with respect to the imaging data.

19. The non-transitory computer readable medium of claim 15, wherein the CAD blueprint indicates positions of fixtures and shelves.

20. The non-transitory computer readable medium of claim 15, wherein the CAD blueprint includes a plurality of rows or aisles of shelves, and the route is generated from the start point to the end point through each of plurality of rows or aisles of shelves.

* * * * *